Patented Dec. 29, 1942

2,306,918

UNITED STATES PATENT OFFICE 2,306,918

AMINE REACTION PRODUCT

John M. Weiss and Robert P. Weiss, New York, N. Y., assignors to Research Corporation, a corporation of New York No Drawing. Application February 15, 1940, Serial No. 319,028

9 Claims. (Cl. 260—78)

This invention relates to the production of resinous reaction products of maleic anhydride compounds with amine compounds and it includes these reaction products themselves as new compounds and compositions of matter.

The invention arose through the discovery that maleic anhydride and certain derivatives thereof, such as chlormaleic anhydride, will react with various amines to form products, many of which are of a resinous character and adapted to be employed as molding and casting resins, in the manufacture of resinous base varnishes, paints and lacquers, in rubber compounding, and in other uses where various types of resins and plastics are customarily employed.

In its broader aspects, the present invention is concerned with a process in which aliphatic dibasic acid anhydrides (or the acids themselves) wherein the carboxyl groups are attached to adjacent carbon atoms joined by a double bond, are reacted with amines to form products which either themselves are resinous in nature or from which resinous bodies can be obtained. The term "amine" as used throughout this specification and the appended claims refers only to those nitrogen-containing compounds in which the nitrogen atom is trivalent, and is connected to one, two or three carbon atoms, and to two or one hydrogen atoms when it is attached to only one or two carbon atoms. Such substances as those of the hydrazine class, wherein nitrogen-to-nitrogen linkages occur, are not amines and are not within the class of substances with which this invention is concerned.

Other substances capable of entering into this characteristic reaction to produce commercially valuable products will hereinafter be disclosed. The present reaction is not to be confused with those which may involve reaction of other substituent groups contained in the amine compound used.

The broad object of the invention is to provide a new group of resins and resin-like bodies having a wide variety of physical and chemical properties. A specific object is to produce for commercial purposes a series of water-insoluble resins and another series of valuable water-soluble resins.

In the well known Diels and Alder reaction (see, for example, United States Patent No. 1,944,731) maleic anhydride is reacted with organic compounds having a characteristic system of conjugated double bonds. It is well known that conjugated double bonds, i. e., the grouping —C=C—C=C—, are quite reactive, both in aliphatic compounds and in hydroaromatic compounds. However, compounds which contain such groupings as

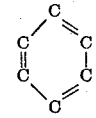

in which there is a ring with three double bonds alternate with three single bonds, as in aromatic and certain heterocyclic compounds, the reactions characteristic of conjugated double bonds that occur in the patented process do not take place, and hence this grouping is not considered reactive in the sense employed in the patent and in the present specification. We have discovered that maleic anhydride, or its equivalent, will react with other organic compounds which may not contain conjugated double bonds, such compounds being those containing an amine group. The present reaction therefore is independent of any double bonds in the reacting amine. It is also known that maleic acid and its anhydride, in common with other dibasic or polybasic acids and anhydrides, such as succinic and phthalic acids and anhydrides, may be reacted with triethanolamine and other amines having a plurality of alkylol groups to form resins. In these cases, however, the reaction takes place between the acids and the multiple hydroxyl groups of the amine to form alkyd-type resins, and these products are not related to the products with which this invention deals, nor is their formation within the purview of the present invention.

In the practice of the invention a reaction occurs and resins may be formed starting with the maleic anhydride compound and primary, secondary or tertiary amines. It appears that the nature of the reaction by which resinous products are produced varies somewhat as between the amines of these three general classes. Thus, in the case of primary amines, it is probable that reaction with maleic anhydride produces a maleamic acid which may be further convreted into a maleimide, and the resinous products appear to be formed from primary amines by the condensation or polymerization of the maleamic acid or the maleimide. In the case of secondary amines, maleamic acid derivatives are formed, and it appears that the resinous products are obtained by condensation or polymerization of the resulting maleamic acid. In the case of tertiary amines a somewhat different action seems to be involved in which these amines induce the resinification of the maleic anhydride compound, and this occurs even when catalytic quantities of the tertiary amine are used, as well as when larger amounts are employed. The present application is directed to both the broader aspects of the invention, and specifically to those embodiments of the invention in which primary amines are employed. Those embodiments of the invention which are concerned with secondary and tertiary amines are the specific objects of copending applications Serial No. 319,029, filed Feb. 15, 1940, and Serial No. 319,030, filed Feb. 15, 1940, respectively.

The reactions herein described are in some cases strongly exothermic. Under such conditions the reaction can usually be controlled by cooling or by the presence of suitable diluents during the reaction. In some cases, however, it may be necessary to heat the reaction materials to high temperatures, or to heat them under pressure. In some instances products such as maleic acid, fumaric acid, malic acid, ethyl fumarate, and the like (that is, substances which appear to liberate maleic anhydride during reaction), may be used instead of maleic anhydride in the practice of the invention. When these substances are used in place of maleic anhydride or its simple derivatives, such as chlormaleic anhydride, heat is usually necessary to start the reaction.

The reaction products may be modified in in various ways. For example, the reaction may be conducted in the presence of glycerine, glycol, or another polyhydric alcohol with or without a modifying acid of a type other than the maleic anhydride compound. Complex resinous masses or mixtures of resins including the products of this invention and alkyd-type materials may be thus obtained. Also, mixtures of amines may be used rather than individual amine compounds to vary the properties of the products, or to take advantage of the varying rates of reaction with maleic anhydride compounds possessed by the various amines.

While the exact nature of the reaction in some instances has not been determined, we have found that in certain cases clearly defined reactions appear to take place. In these reactions water vapor, volatile intermediate products, or carbon dioxide may be evolved. The difference in properties obtained by heating the same ingredients at different temperatures also shows that an initial reaction may take place forming products which may or may not have resinous properties, and which products thereafter condense or polymerize to form resinous masses. All intermediate resinous or resin-forming products as well as final products are part of this invention.

As has been indicated, in the reaction of maleic anhydride with a primary amine, which may be aromatic or aliphatic or in which the organic radical may be an aralkyl group, it appears that there is first formed an N-substituted maleamic acid from which there may be subsequently formed a correspondingly substituted maleimide accompanied by the liberation of water. In the reactions employing primary amines, the resinous products appear to be the result of the condensation or polymerization of the N-substituted maleamic acids or maleimides. These reactions may be illustrated by the following scheme:

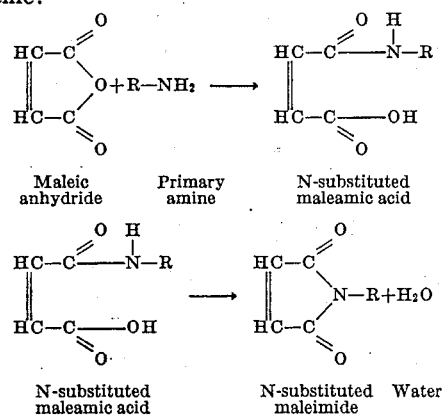

Various proportions of the reacting materials may be used in the practice of the invention. In the case of primary and secondary amines the reaction may occur in molecular proportions of the maleic anhydride compound and the amine or in multiples of these proportions, according to the number of amino groups in the amine compound, but it is not necessary to employ these proportions, and greater or lesser amounts may be used. In the case of tertiary amines, resins may be formed employing the amine in any quantity from very small catalytic amounts, say, 0.5%, upward. It is therefore to be understood that the present invention is not limited to any particular reacting proportions of the ingredients.

The invention will be illustrated by the following examples which are typical of its scope but which are not intended in any way to indicate its limits.

*Example I*

Butylamine ($CH_3CH_2CH_2CH_2 \cdot NH_2$) was added slowly to molten maleic anhydride while stirring and cooling the latter to a point where it just remained molten. Equal molecular quantities of the materials were employed. N-butyl maleamic acid was obtained as a white solid which was soluble in water and which melted without further purification at 76° C. When this compound was heated under reduced pressure at temperatures raised gradually from 130° C. to about 230° C., a liquid product was formed which distilled together with water, leaving behind a resinous product which was dark in color, soluble in acetone, and insoluble in water and hexane. The properties of this resinous product may be compared with those of polymerized N-butyl maleimide to be described below.

The liquid product which distilled over was redistilled and found to boil between 79° C. and 86° C. at an absolute pressure of 4 mm. of mercury. The mid-portion boiling at 82° C. to 83° C. at this pressure was separately collected. Saponification of a sample of this fraction with sodium hydroxide yielded, first, N-butyl maleamic acid, and, finally, butylamine, as would be expected from N-butyl maleimide. The product which thus appears to be N-butyl maleimide is a colorless liquid at ordinary temperatures, possesses a very sharp odor and acts as an irritant on the mucous membranes. This product was found to polymerize after several hours heating at 125° C. to yield a product which was soluble in acetone and which could be precipitated from its acetone solutions by methanol to give a granular white powder. In the presence of a catalyst (1% of dibenzoyl peroxide) the butyl maleimide polymerized very quickly at moderate temperatures on the steam bath to form a resin having properties similar to those of the resin obtained by polymerization in the absence of catalysts.

Example II

One mol of ethylene diamine (a primary polyamine) in the form of a 70% aqueous solution of the amine, was added drop-wise to molten maleic anhydride. A violent reaction took place giving a light brown, somewhat brittle, resin with but very little further heating. This resin was partially soluble in water but was insoluble in acetone.

Example III

One hundred parts by weight of maleic anhydride crystals were added to about 90 parts of commercial monoamylamine. A spontaneous exothermic reaction took place without the application of external heat which resulted in the formation of about 180 parts of clear transparent reddish yellow resinous liquid which was viscous at room temperature. This liquid was insoluble in water but perfectly soluble in 95% ethyl alcohol. Treated with sodium hydroxide solution, it was broken up to give a milky suspension. When the liquid was baked at 150° C. for some time, a resinous material was produced which was a plastic solid at ordinary temperatures.

Example IV

In another batch, a mixture was made of 87 parts by weight of monoamylamine and 30 parts of urea and 196 parts of maleic anhydride added. The temperature was raised by the heat of reaction to 100° C. with evolution of vapors. The product amounted to 300 parts by weight and was a yellow liquid when cooled to room temperature. This liquid was heated to 160° C. when a further vigorous reaction with foaming set in. After this, on cooling, the product became a hard orange red resin, transparent and slightly sticky. It was insoluble in cold water and slightly soluble in hot water. It was extremely soluble in 95% ethyl alcohol and quite soluble in 50% ethyl alcohol.

Example V

About 100 parts by weight of maleic anhydride was dissolved in about 10 times its weight of benzol and this solution was slowly added to 60 parts of ethylene diamine (commercial 95% material). As each drop contacted with the diamine, a momentary precipitate was noted at the start which precipitate redissolved on stirring. Heat was evolved by the reaction. After about one-fifth of the benzol solution had been added, the precipitate would not completely redissolve as it was formed and from then on increased rapidly in amount. At the end there was a mass of gelatinous solids suspended in the benzol solution. The benzol was removed by evaporation at 100° C. and the solids dried. A yield of about 159 parts was obtained. The product was a lemon yellow mass of amorphous resinous appearance. A portion of these solids was baked for one hour at 150° C. and the baked material took on a light orange yellow color. When the baked solids were placed in water, they slowly took up water to form a jelly somewhat in the way agar agar acts and finally went into solution. The solids were readily soluble in caustic soda. With ethyl alcohol (95%) a milky suspension was obtained.

In addition to the reactions above described in detail, resins have been formed from maleic anhydride with urea to form a brown resin soluble in water, difficultly soluble in cold 95% ethyl alcohol, and readily soluble in hot alcohol. Mixtures of urea and aniline likewise when reacted with maleic anhydride yielded a resin which was not soluble in cold water and was difficultly soluble in hot water, but it was soluble in alcohol. Thiourea and monoethanolamine also have been used in the practice of this invention to form resins.

It will be apparent that the invention is not limited to any particular procedure for introducing the ingredients into the reaction or for conducting the reaction itself. Acid imides and amino compounds containing carboxyl or sulfonic acid groups react with difficulty, if at all, with maleic anhydride, but where capable of reaction such compounds may be used in the practice of the invention.

Preferred aliphatic dibasic acid compounds for use in the invention include maleic anhydride itself, and those products above specified which appear to liberate maleic anhydride in the course of the reaction, as well as halogen derivatives of such compounds. Since this invention provides an entirely new series of resins and resinous materials, it will be obvious that these may be modified in the usual way by admixing them with other artificial resins, or natural resins and gums, and with such materials as cellulose esters, ethers or related derivatives, and that pigments, filler materials, plasticizers, waxes and the like, may be included in compositions containing the new resins which are employed to form protective coatings, sheet products or molded objects. Other modifications of the resins and resin-forming reactions disclosed will be apparent, and these variations are included within our invention as defined by the appended claims.

This application contains subject matter in common with and is, in part, a continuation of our copending applications Serial No. 737,204, filed July 27, 1934; Serial No. 132,710, filed March 24, 1937; and Serial No. 132,737, filed March 24, 1937.

We claim:

1. Process for making an artificial resinous body which comprises reacting an anhydride of a polybasic aliphatic acid compound having two carboxyl groups attached to adjacent carbon atoms joined by an olefinic double bond with essentially only a primary aliphatic amine, condensing the carboxyl groups of said polybasic acid compound substantially only with amino groups, and further condensing or polymerizing the product thus obtained with itself to form a resinous body.

2. Process for making an artificial resinous body which comprises heating compounds capable of yielding maleic anhydride under the conditions of the process with essentially only a primary aliphatic amine, condensing the carboxyl groups of said yielded maleic anhydride substantially only with amino groups, and further condensing or polymerizing the product thus obtained with itself to form a resinous body.

3. Process for making an artificial resinous body which comprises reacting an anhydride of a polybasic aliphatic acid compound having two carboxyl groups attached to adjacent carbon atoms joined by an olefinic double bond with essentially only a primary aliphatic polyamine, condensing the carboxyl groups of said polybasic acid compound substantially only with amino groups, and further condensing or polymerizing the product thus obtained with itself to form a resinous body.

4. Process for making an artificial resinous body which comprises reacting maleic anhydride with essentially only a primary aliphatic monoamine, condensing the carboxyl groups of said maleic anhydride substantially only with amino groups, and further condensing or polymerizing the product thus obtained with itself to form a resinous body.

5. An artificial resinous body resulting from the condensation or polymerization with itself of a product obtained by the reaction of essentially only a primary aliphatic amine with an anhydride of a polybasic aliphatic acid compound having two carboxyl groups attached to adjacent carbon atoms joined by an olefinic double bond, the carboxyl groups of said polybasic acid compound being condensed substantially only with amino groups in forming said product.

6. An artificial resinous body resulting from the condensation or polymerization with itself of a product obtained by the reaction of essentially only a primary aliphatic polyamine with an anhydride of a polybasic aliphatic acid compound having two carboxyl groups attached to adjacent carbon atoms joined by an olefinic double bond, the carboxyl groups of said polybasic acid compound being condensed substantially only with amino groups in forming said product.

7. An artificial resinous body resulting from the condensation or polymerization with itself of a product obtained by the reaction of essentially only a primary aliphatic amine with maleic anhydride, the carboxyl groups of said maleic anhydride being condensed substantially only with amino groups in forming said product.

8. Process for making an artificial resinous body which comprises polymerizing an N-alkyl substituted maleimide and recovering a resinous polymerization product thereof.

9. An artificial resinous body resulting from the polymerization of an N-alkyl substituted maleimide.

JOHN M. WEISS.
ROBERT P. WEISS.